July 25, 1972 D. H. MAYLOTTE 3,679,461

METHOD FOR MAKING PHOTOPOLYMERIZED TETRAFLUOROETHYLENE FILMS

Filed June 30, 1970

INVENTOR:
DONALD H. MAYLOTTE
by William A. Teoli
HIS ATTORNEY

United States Patent Office 3,679,461
Patented July 25, 1972

3,679,461

METHOD FOR MAKING PHOTOPOLYMERIZED TETRAFLUOROETHYLENE FILMS

Donald H. Maylotte, Schenectady, N.Y., assignor to General Electric Company

Filed June 30, 1970, Ser. No. 51,277
Int. Cl. B44d 1/50
U.S. Cl. 117—93.31 6 Claims

ABSTRACT OF THE DISCLOSURE

A method is provided for improving the rate of surface photopolymerization of tetrafluoroethylene to make continuous imperforate films and substrate-film composites. Surface photopolymerization of tetrafluoroethylene is achieved at pressures above 25 torr by positioning the substrate at a distance from the ultraviolet light source within the tetrafluoroethylene photopolymerization zone sufficient to provide for the production of continuous film. Composites made by the subject method can be utilized to make capacitors, cryogenic devices, etc.

Figure 1:
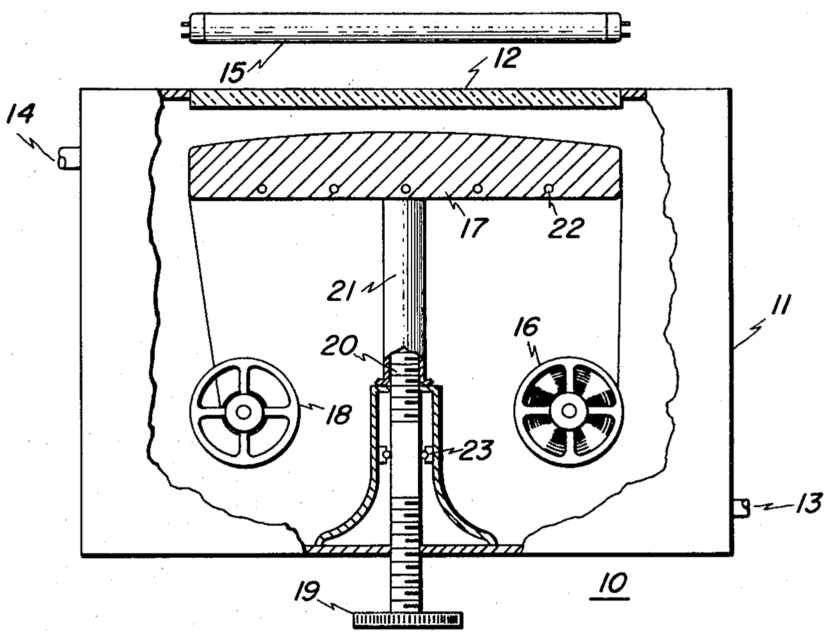

The present invention relates to a method for making substrate-film composites by effecting the surface photopolymerization of tetrafluoroethylene.

Prior to the present invention, various methods were known for polymerizing tetrafluoroethylene utilizing ultraviolet light. Vogh Pat. 3,228,865, for example, teaches that tetrafluoroethylene can be polymerized using ultraviolet light at a wavelength of from about 2500 angstroms to 2700 angstroms. A white solid is obtained having physical properties identical with polytetrafluoroethylene produced by conventional polymerization methods, such as emulsion polymerization techniques, by photopolymerizing the tetrafluoroethylene at pressures exceeding 500 torr. Another method of polymerizing tetrafluoroethylene with ultraviolet light is shown by Italian Pat. 791,792. This patent teaches that photopolymerization of tetrafluoroethylene at pressures of up to about 8 torr utilizing ultraviolet light at a wavelength of up to 3500 angstroms in contact with a substrate, can result in the production of a thin, imperforate film, useful as an insulator or dielectric. Although the method of the Italian patent can be employed to produce continuous, imperforate, adherent photopolymerized tetrafluoroethylene films on substrates, the growth rate of the photopolymerized tetrafluoroethylene film is less than 70 angstroms per minute. It has been found that if pressures above 8 torr are employed in the method of the Italian patent, gas phase photopolymerization results. Those skilled in the art know that unless surface photopolymerization of tetrafluoroethylene is achieved, continuous imperforate dielectric films cannot be obtained.

The present invention is based on the discovery that tetrafluoroethylene can be surface photopolymerized to produce continuous imperforate films at an average rate of up to 500 angstroms per minute by using pressures of from about 25 torr to about 200 torr. It has been found that films having thicknesses of up to 50,000 angstroms or higher can be made, if the substrate is positioned within the photopolymerization zone at a critical distance from the ultraviolet light source. For example, there can be employed a distance of less than about 5 mm. between the substrate and the ultraviolet light source in the photopolymerization zone.

It is not completely understood why an improved rate of film growth can be achieved with tetrafluoroethylene at pressures above 25 torr, because at lower pressures, for example, at pressures even as low as 10 torr, tetrafluoroethylene can photopolymerize in the gas phase to a white fluffy powder instead of a film. One possible explanation is that either surface photopolymerization or gas phase photopolymerization can take place at pressures up to about 200 torr depending upon the distance photolized $\cdot CF_2$ free radicals, or aggregates with tetrafluoroethylene molecules have to travel in the photopolymerized zone before their path is interrupted by the substrate. It is believed, for example, that photolized tetrafluoroethylene free radicals, or aggregates thereof will form a continuous film if their path prior to impact with the substrate surface does not exceed a distance permitting undue aggregate growth unsuitable for surface photopolymerization.

In determining whether surface photopolymerization, or gas phase photopolymerization has taken place, the substrate surface can be visually examined after the photopolymerization period. If there is film which appears to be clear on the substrate surface, it is likely that surface photopolymerization has been achieved. A film having a dissipation factor of less than about 1 percent at 1000 c.p.s. and room temperature also establishes whether surface photopolymerization has taken place. In measuring the dissipation factor, the film is preferably formed on an evaporated metal surface, for example aluminum, and a mercury drop is employed on the available film surface as the second electrode. A one kiloherz signal can be employed employing a General Radio Impedance Bridge Type 1650A. A further technique is by use of an interferometer to measure the thickness of the film, as shown by S. Tolonsky, Multiple Beam Interferometry, Oxford, at the Carendon Press (1948).

There is provided by the present invention a method for making a continuous film by the surface photopolymerization of tetrafluoroethylene, employing an apparatus comprising an enclosure having a window allowing for the transmission of ultraviolet light, an ultraviolet light source, and a substrate, involving the improvement of effecting the surface photopolymerization of tetrafluoroethylene in the enclosure at a pressure between about 25 torr to about 200 torr by employing the substrate in the photopolymerization zone within a distance from the window sufficient to provide continuous film.

The films and coatings formed in accordance with the present invention exhibit good chemical resistance, have high dielectric strength, are pin-hole free and exhibit good temperature stability. These films and coatings are useful for a wide variety of applications including covering layers for various metallic and nonmetallic substrates, capacitor dielectrics, cryogenic devices insulation, insulation for microelectronic devices, insulation for metallic conductors and for corrosion protection, and as nonthrombogenic coatings. The films have a dissipation factor of less than 1 percent utilizing a one kiloherz signal.

The future and advantage of the present invention will be better taken in connection with the accompanying drawing in which:

FIG. 1 shows an apparatus for depositing potopolymerized tetrafluoroethylene on a substrate in an enclosure, to produce the films and composites in accordance with the practice of the invention.

Figure 2:
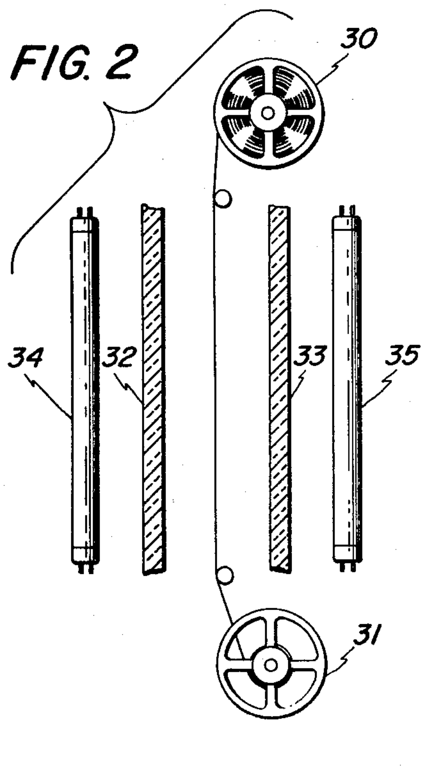

FIG. 2, a modification of the apparatus of FIG. I shows apparatus, providing simultaneous deposition of surface photopolymerized tetrafluoroethylene film on both sides of a substrate.

Figure 3:
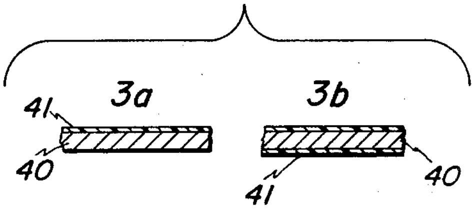

FIG. 3 shows certain substrate film composites provided by the apparatus of FIGS. I and II respectively, which can be used to make capacitor rolls.

In FIG. 1 of the drawing, apparatus is shown generally at 10 for former films, coatings and products in accordance with the invention. An enclosure, or chamber is shown at 11, having a quartz window 12, and ducts 13 and 14 for introducing tetrafluoroethylene and evacuating air. An ultraviolet lamp is shown at 15. Apparatus within the chamber is shown to provide the passage of flexible substrate, such as aluminum foil from supply roller 16 across bracket 17 to take-up roller 18 and means not shown for activating take-up roller 18. Distance between curved bracket 17 resting on sleeve 21, and window 12 is controlled by adjusting thumb screw 19 to actuate threaded shaft 20. Bracket 17 has cooling ducts 22, with entry and exit means not shown. An O-ring seal is shown at 23.

In FIG. 2, supply spool 30 and take-up spool 31, provide for passage of flexible substrate, such as aluminum at a fixed distance, from quartz windows 32 and 33 and ultraviolet lamps 34 and 35. An atmosphere of tetrafluoroethylene is provided in chamber having ducts to adjust the pressure of the tetrafluoroethylene to a desirable level.

FIG. 3 shows composites of tertafluoroethylene and a flexible substrate made by using the apparatus of FIGS. 1 and 2 respectively. In FIG. 3 at the left, tetrafluoroethylene is shown at 41 and the flexible substrate is shown at 40. The composite at the right shows the flexible substrate with tetrafluoroethylene film on both sides.

In accordance with the practice of the invention, apparatus as illustrated by FIG. 1, is evacuated and tetrafluoroethylene is introduced at a pressure in the range of between 25 torr to 200 torr. Aluminum foil, one inch wide, is provided within a distance of less than about 5 millimeters from the quartz window by passing the foil from the supply roller over the bracket which has been adjusted to the desired distance onto the take-up spool. The r.p.m. of the take-up spool is adjusted to provide film having an average thickness of up to 50,000 angstroms on the surface of the aluminum foil as a result of a rate of deposition of up to 500 angstroms per minute.

It has been found that the surface of the substrate employed in the surface photopolymerization method must be maintained by temperature in the range of between about −100° C. to +100° C., and preferably at a temperature between 0° C. to 70° C. The substrate can be cooled by passing a suitable heat exchange medium through the substrate support utilizing appropriate coding ducts, as shown in FIG. 1.

Ultraviolet light having a wavelength in the range of between about 1800 to about 3500 angstroms can be employed and preferably a wavelength between about 1800 to 2300 angstroms. The intensity of the light employed should be at least sufficient to provide for 100 milliwatts, per square centimeter on the film surface. Intensity can be readily determined by the rating of the lamp employed and the distance the lamp is utilized from the source of the organic polymeric film. Determination of intensity can be made with the use of a thermopile as described by R. G. Madden, Applied Optics, vol. 4, No. 2 (December 1965) p. 1574.

In another aspect of the invention, an aluminum foil as shown in FIG. 2, can be passed through a photopolymerization zone at a distance within 5 millimeters from either side of a quartz window. The tetrafluoroethylene can be employed at a pressure of from about 25 torr to 200 torr in the photopolymerization zone. Dissipation of heat can be achieved by immersing the evacuated chamber containing the quartz windows in an appropriate heat exchange medium. Depending upon the rate at which surface photopolymerization proceeds, the aluminum foil can be passed through the polymerization zone at any appropriate speed to provide for an aluminum composite having surface photopolymerized tetrafluoroethylene film on both sides at thicknesses of up to 50,000 angstroms.

The composites of FIG. 3 can consist of tetrafluoroethylene on an appropriate substrate, which can include, for example, flexible metals, in addition to aluminum, such as copper, steel, etc., flexible metallized substrates, such as metallized plastics, for example evaporated gold, aluminum or copper on Mylar film, Kapton H film, etc., other flexible substrates such as paper, textiles, etc. These composites can be employed in a variety of applications. In instances where the composite consists of a metal substrate, such as aluminum, it can be rolled to produce a capacitor roll by standard techniques known at the art.

In order that those skilled in the art will be better able to practice the invention, the following examples are given by way of illustration and not by way of limitation:

EXAMPLE 1

Apparatus is set up in accordance with FIG. 1 in the drawing. Aluminum foil having a width of about 2½ cm. is employed as the substrate. It is placed over the face of the curved substrate support at an average distance of 5 mm. or less from the quartz window. The chamber is evacuated and tetrafluoroethylene is introduced. An ultraviolet light source in the form of a Hanovia 700 watt lamp with a reflector which emits ultraviolet light at a wave length of between about 1800 to 2300 angstroms at an intensity of at least 100 milliwatts per square centimeter, as measured on the substrate surface, is placed above the quartz window and spaced about 9 cm. above the quartz window. During the irradiation period, the temperature of the substrate is maintained at about 29° C. The substrate is passed under the quartz window at an average speed of 3 cm./per minute. Total irradiation time averages 2 minutes. The following table shows the results obtained where "TFE P" indicates the vapor pressure of tetrafluoroethylene employed during photopolymerization, "Distance" indicates the average distance in mm. of the aluminum foil substrate from the quartz window during irradiation, "Film" indicates whether a film is formed on the aluminum substrate. In instances where film is formed, the "percent DF" (dissipation factor) is shown based on test conditions utilizing a one kiloherz signal as previously defined. Also shown is growth rate (A./min.) where film formation is indicated.

TABLE

| "TFE P" (torr) | Distance (mm.) | Film | Growth rate (per min.) A. | Percent DF |
|---|---|---|---|---|
| 1.5 | 1-3 | No | | |
| 5 | 1-3 | No | | |
| 25 | 1-3 | Yes | 200-400 | <0.8 |
| 100 | >5 | No | | |
| 100 | <1-3 | Yes | 300-500 | <0.5 |
| 200 | <1-3 | Yes | 400-600 | <0.5 |

In particular instances, such as when the pressure is below 25 torr, or when the distance from the substrate exceeds 5 mm., cloudy film is formed having a percent DF of greater than 1 percent.

The films made in accordance with the above method employing a distance of about .05 mm. to 3 mm. and a tetrafluoroethylene vapor pressure of from about 25 torr to 200 torr is found to be continuous, pin-hole free and adherent to aluminum. Those skilled in the art would know that films and composites made in accordance with the present invention, for example composites of tetrafluoroethylene and substrates such as paper, metals such as copper, gold, etc., thermoplastics such as polyethyleneterephthalate, etc., can be employed to fabricate cooking utensils, textiles, etc., insulators, dielectrics, etc.

Although the above example is limited to only a few of the very many variables and apparatus which can be employed in the present invention, it should be understood that the present method invention can be utilized with a much broader class of apparatus and conditions to produce continuous, imperforate pin-hole free films.

I claim:

1. In a method for surface photopolymerizing tetrafluoroethylene employing an apparatus comprising an enclosure having a window allowing for the transmission of ultraviolet light, an ultraviolet light source and a substrate, the improvement comprising introducing tetrafluoroethylene into the enclosure at a pressure between about 25 torr to about 200 torr, placing the substrate in confronting relationship with the window and spaced therefrom to define therebetween a photopolymerization zone, and adjusting the distance between the substrate and the window so as to prevent gas phase polymerization from occuring.

2. A method in accordance with claim 1, where the substrate is employed at a distance of less than about 5 mm. from the surface of the window in the photopolymerization zone.

3. A method in accordance with claim 1, where the ultraviolet light has a wavelength of between about 1800 angstroms to 2500 angstroms.

4. A method in accordance with claim 1, where the substrate is aluminum foil.

5. A method in accordance with claim 1, which comprises effecting the surface photopolymerizing of tetrafluoroethylene at a pressure of between about 25 torr to 200 torr on the surface of aluminum, which is positioned in the polymerization zone at a distance of within 5 mm. from the source of photolized tetrafluoroethylene free radicals.

6. A method of making a capacitor utilizing a tetrafluoroethylene aluminum composite made in accordance with claim 1.

References Cited

UNITED STATES PATENTS

| | | | |
|---|---|---|---|
| 2,932,591 | 4/1960 | Goodman | 117—93.1 GD |
| 3,068,510 | 12/1962 | Coleman | 117—93.1 GD |
| 3,309,221 | 3/1967 | Smith | 117—93.1 GD |
| 3,310,424 | 3/1967 | Wehner et al. | 117—93.1 GD |
| 3,389,012 | 6/1968 | Hamm | 117—93.31 |

ALFRED L. LEAVITT, Primary Examiner

J. H. NEWSOME, Assistant Examiner

U.S. Cl. X.R.

117—132 CF, 161 UF; 204—159.22